Figure 1:
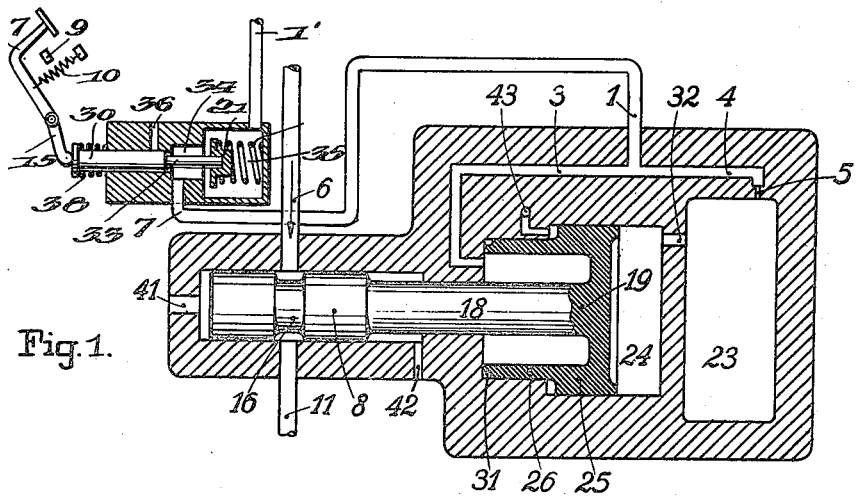

Jan. 27, 1942.   C. BÖTTNER   2,271,169
CONTROL MECHANISM FOR POWER OPERATED GEAR SHIFTING APPARATUS
Filed Oct. 30, 1937

Inventor:
Carl Böttner
Edmund H. Parry jr.
Attorney

Patented Jan. 27, 1942

2,271,169

UNITED STATES PATENT OFFICE 2,271,169

CONTROL MECHANISM FOR POWER OPERATED GEAR SHIFTING APPARATUS

Carl Böttner, Friedrichshafen, Bodensee, Germany, assignor to Maybach-Motorenbau G. m. b. H., Friedrichshafen, Bodensee, Germany Application October 30, 1937, Serial No. 172,021
In Germany October 31, 1936

10 Claims. (Cl. 137—139)

This invention is directed to a control device for the operating pressure medium of a pressure operated gear shifting mechanism, for use particularly with motor vehicle gear transmissions, wherein a power-operated control valve is opened to initiate the flow of pressure to, and consequent shifting action of, the shifting mechanism upon movement in a single direction of an operating lever. The operating lever may be the clutch pedal or gas throttle lever of the vehicle, or may be a special lever provided for the particular purpose. The power for actuating the control valve and which is initiated by the lever will preferably be a fluid pressure medium, either from the same or a different source as the operating pressure for the shifting mechanism, but also may be mechanical or electrical power.

According to the invention, the valve controlling the shifting pressure is closed upon completion of the shifting operation initiated by the operating lever. The particular feature of the invention is that the same actuating power which opens the control valve is also utilized thereafter in connection with the closing of the valve, to move the valve to closed position and to hold the valve in closed position. The actuating power can be rendered automatically effective for either or both of these purposes independently of the operating lever, so that once the lever has been initially moved to cause opening of the control valve, no further movement of the lever is required incident to the closing of the valve after the shifting operation has been completed. Through the use of the same actuating pressure for both opening the control valve and closing the same, it is possible to provide a control device which is particularly simple in construction and very reliable in operation.

As a further feature of the invention, the control valve may be so arranged that when the valve has been opened to supply pressure to the shifting mechanism and then closed, the power acting on the valve may be dissipated and the valve again opened to again supply pressure to the shifting mechanism even where there is no repeated movement of the operating lever to supply actuating pressure for the valve.

The control member controlling the shifting pressure can be either a disc valve or a slide valve, or, in the case where it is desired to provide for a further shifting operation upon movement of the operating lever in the reverse direction, the shift control member can take the form of a double acting valve which cuts off the supply of pressure medium in each of two end positions. A control device utilizing such a double acting valve forms the subject-matter of the copending joint application of Karl Maybach, Carl Böttner, Eugen Glücker and Gustav Meyer, Serial No. 172,020, filed October 30, 1937, now Patent No. 2,236,646, of April 1, 1941.

While it is contemplated under the present invention to utilize the same actuating power which causes the valve to open to close the same, the valve may be subject to control by the shifting pressure, in accordance with the copending application of Gustav Meyer, Serial No. 172,019, filed October 30, 1937, so as to be held open by the shifting pressure and allowed to close only after sufficient pressure has been supplied to the shifting mechanism to complete the shifting operation.

Figure 2:
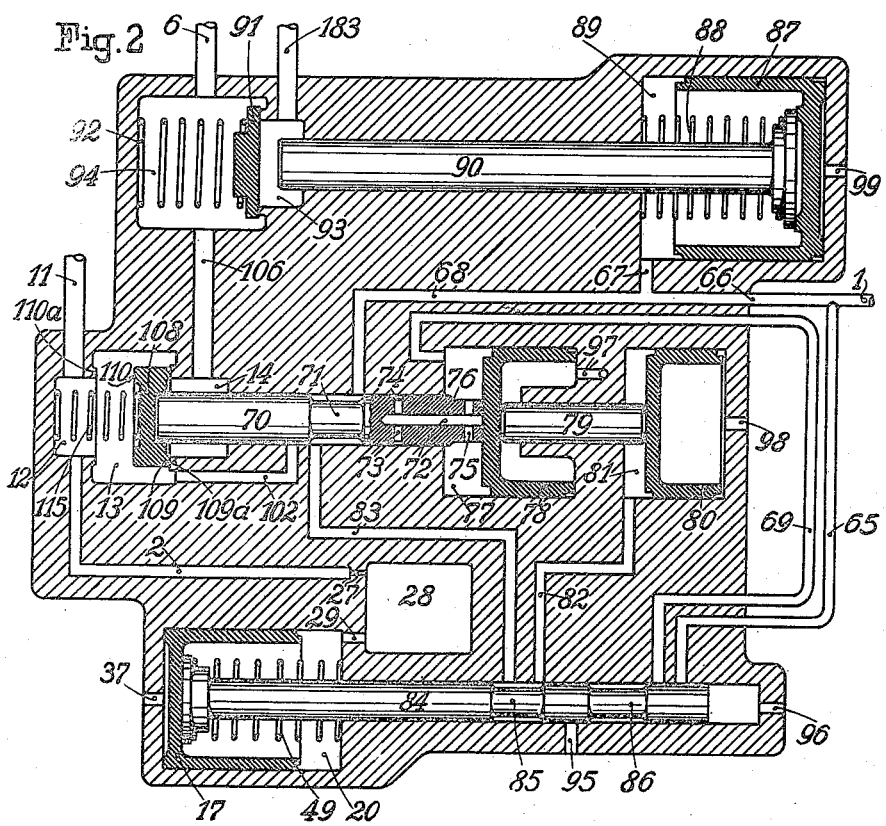

The invention may be used in connection with gear shifting mechanisms operated by either superatmospheric pressure, or by partial vacuum from the intake manifold of a vehicle or some other source. Figures 1 and 2 in the drawing are diagrammatic views, mostly in section, showing two different embodiments of the invention designed to employ partial vacuum as the actuating power for the valve controlling the shifting pressure.

In the embodiment of Figure 1 line 6 is a supply line which will connect with a suitable source of pressure, either superatmospheric or a partial vacuum. Line 11 will connect with the pressure responsive gear shifting mechanism. Slide valve 8 provided with groove 16 controls the transmission of pressure from line 6 to line 11. Valve 8 is shown in its left open position. When moved to the right in its casing the valve will be closed. Ports 41 and 42 are provided at the opposite ends of the valve casing to prevent pressure from building up at the ends of the valve which would interfere with movement of the valve.

In accordance with the invention as previously stated, it is proposed that the valve 8 be moved to both open and closed positions by the same actuating power. In the present instance the valve actuating mechanism is in the form of a differential piston 19 connected to valve 8 by rod 18. The smaller portion 26 of the piston works in chamber 31 of the housing of the control device. The larger portion 25 of the piston works in the larger chamber 24. A vent port 43 connects with the left end of chamber 24.

Vacuum pressure for actuating piston 19 is supplied through line 1. The left branch 3 of line 1 communicates with the left end of chamber 31. The right branch 4 of line 1 connects through a throttling orifice 5 with a chamber 23 in the housing. Such chamber in turn communicates through port 32 with the larger chamber 24 on the right of the piston.

The supply of actuating pressure for operating the control valve is made dependent upon an operating lever through a conventional arrangement. The operating lever is here indicated at 7, and the same may be either a special lever provided for the purpose or the clutch pedal or gas throttle lever of the motor vehicle. In its rest position lever 7 is held against a stop 9 by spring 10. Arm 15 of the lever 7 acts against the head of slide rod 30 when the lever is depressed to open valve 21 in chamber 35 against the action of springs 22 and 38. Partial vacuum from a suitable source of supply, such as the intake manifold of the vehicle motor, is supplied to chamber 35 through line 1'. To the left of valve 21 is a smaller chamber 34 with which connects line 1 leading to the piston of the control device. When lever 7 is returned to its rest position, rod 30 moves to the left to allow valve 21 to engage its seat. At such time chamber 34 is cut off from chamber 35 and line 1', and through the reduced right portion 33 of rod 30 and port 36, chamber 34 and line 1 are vented to the atmosphere.

Assuming that lever 7 has been depressed, partial vacuum is transmitted through line 1 simultaneously to branches 3 and 4 thereof. The partial vacuum transmitted through line 3 has reached the chamber 31 and has caused piston 19 to move to the left so that, as shown in the drawing, valve 8 is open and shifting pressure is being supplied from line 6 to line 11 for causing operation of the gear shifting mechanism (not shown). In the meantime partial vacuum from line 4 reaches chamber 23 through the restricted orifice 5 and finally reaches chamber 24 through port 32. Depending upon the size of the throttling orifice and the chamber 23, it takes a certain amount of time, though comparatively short, until the partial vacuum in chamber 24 has become sufficiently great to affect the piston 19. The vacuum in chamber 24 will, however, increase to the point where, due to the greater size of chamber 24, the vacuum acting on the right end of the piston will be greater than the effective vacuum acting on the left end of the piston. As soon as this occurs the piston will be drawn from its left end position to its right end position to close slide valve 8 and thus cut off line 11 from the supply of shifting pressure transmitted through line 6. It will be seen that with this arrangement the actuating pressure supplied through line 1 under control of the lever first acts on the left end of the piston to cause the control valve to open, and then acts through line 4 on the right end of the piston to cause the control valve to close. The movement of the valve to its left open position is effected upon depressing the operating lever 7. The subsequent movement of the valve back to closed position is effected automatically, independently of and without further movement of lever 7.

Valve 8 and piston 19 will be held in their right end positions as long as lever 7 is held depressed to maintain a vacuum pressure supply through line 1 to chamber 24. If now the driver returns lever 7 to its rest position the partial vacuum in lines 1, 3 and 4 and chambers 24 and 31 disappears. Valve 8 will not again open to supply pressure for a new shift operating until lever 7 is again depressed.

In the embodiment of Figure 2 the control device embodies a double acting control valve which, according to the present invention, is moved from open to closed position and held in closed position by the same actuating pressure that initially, under movement of an operating lever, effected the opening of the valve. The general arrangement of the control valve constitutes the subject-matter of the copending joint application of Karl Maybach, Carl Böttner, Eugen Glücker and Gustav Meyer, Serial No. 172,020, filed October 30, 1937. The feature of utilizing the shifting pressure for maintaining the control valve in its intermediate open position forms the subject-matter of the copending application of Gustav Meyer, Serial No. 172,019, filed October 30, 1937.

Referring now to Figure 2, the double acting valve controlling the supply of operating pressure to the gear shifting mechanism (not shown) is indicated at 108, the same being housed in a valve chamber 13. In its right end position face 109 of the valve engages valve seat 109a to close off a smaller chamber 14 from valve chamber 13. In the left end position of the control valve, valve face 110 will engage valve seat 110a to close off the smaller chamber 12 from chamber 13. Partial vacuum for operating the shifting gear mechanism will enter the control device through line 6 and passes therefrom through chamber 94 and passage 106 to the right chamber 14. When valve 108 is in open position the pressure medium from line 6 will be transmitted through chambers 14, 13 and 12 to conduit 11. The pressure responsive gear shifting mechanism and the pressure distributing valve mechanism for effecting selective operation thereof to produce different gear selections in a motor vehicle gear transmission are well known in the art and have not been shown. It will be understood that conduit 11 supplies operating pressure thereto under control of valve 108.

Valve 108 is supported by a slide rod 70 and is normally held in its right end position by spring 115. The valve actuating mechanism includes piston 78 slidable in chamber 77 which acts against the right end of rod 70, and a second piston 80 in chamber 81 which through slide pin 79 serves to move piston 78, rod 70 and valve 108. Chamber 81 is of less depth than chamber 77 so that piston 80 has a shorter stroke than piston 78.

Actuating pressure, here partial vacuum, for initiating opening of valve 108 is supplied through line 1 under control of an operating lever through a conventional arrangement such, for example, as illustrated in connection with Figure 1. The operating pressure in line 1 is transmitted through its branch 66, and through lines 68, 83 and 82 to chamber 81. Piston 80 is thereupon moved to its left end position to move valve 108 to its intermediate open position in chamber 13. Shifting pressure from line 6 is thereupon transmitted through line 11 to the gear shifting mechanism. When valve 108 reaches its intermediate open position, groove 71 in slide rod 70 is cut off from line 68, but such groove now provides communication between line 102 extending from valve chamber 13 and line 83. Shifting pressure supplied from line 6 and available in chamber 13 is then supplied through lines 102, 83 and 82 to chamber 81 to act on piston 80 and hold valve 108 in its intermediate open position against the force of spring 115.

In the lower portion of the housing is located a slide valve 84 having therein a groove 85 which establishes communication between lines 83 and 82. A piston 17 is provided at the left end of rod 84 in chamber 20, and the same is normally held in its left end position by spring 49. The arrangement shown is intended to maintain the control valve in its open position and control the closing thereof in dependency on the shifting pressure as more fully explained in the above-identified application of Gustav Meyer. Accordingly, line 2 communicating with chamber 12 is provided to supply shifting pressure to chamber 20 of piston 17, the same connecting therewith through a throttling orifice 27, chamber 28 and port 29. When valve 108 has been moved to its open position by piston 80 partial vacuum is transmitted through line 102, and after a short time the vacuum reaches a point in chamber 20 to cause piston 17 to move to the right. The delay in the operation of piston 17 after valve 108 is opened is determined by the size of orifice 27, and with the view that valve 108 will not be allowed to close until after sufficient shifting pressure has been transmitted through line 11 to cause operation of the shifting mechanism.

When piston 17 is moved to the right by the shifting pressure in the manner just explained valve 108 is ready to be moved on to its closed left end position. Such movement is accomplished by the second piston 78 which, according to the present invention, will be actuated by the same pressure as effected the initial opening of the valve through piston 80. It will be noted that in addition to branch 66 through which actuating pressure was initially supplied to piston 80, line 1 has a second branch 65 which, when piston 17 moves to the right, supplies operating pressure through groove 86 to line 69 communicating with chamber 77. Partial vacuum thereupon acts on piston 78 to move the same to the extreme left. Such movement through rod 70 moves valve 108 against its left seat 110a, thus cutting off the supply of shifting pressure from line 6 to line 11 and also line 2 since chamber 12 is no longer in communication with chamber 13.

When rod 70 has moved valve 108 to its closed end position, the partial vacuum existing in chamber 20 will be rather quickly dissipated by leakage through port 37 around the piston 17. Thereupon piston 17 will be moved back to its left end position through spring 49, thus closing valve 86 and cutting off the supply of vacuum to piston 78 through line 69. On the other hand, when valve 108 has reached its left end position, radial bore 73 and its surrounding annular groove 74 are in registry with line 68, and through the axial bore 72 and the second radial bore 75 actuating pressure from the first branch, 66, of line 1 is supplied to chamber 77 to hold piston 78 in its left position and maintain valve 108 in its left closed end position against the action of spring 115.

Through the arrangement as described it will be seen that the actuating pressure, partial vacuum, which is supplied through line 1 upon movement of the operating lever in one direction, initially acts through lines 66, 68, 83 and 82 and piston 80 to move the shifting pressure control valve 108 from its right closed end position to intermediate open position, and such same actuating pressure, following movement of piston 17 to the right, then acts through lines 65 and 69 and the second piston 78 to move the control valve from its intermediate open to its left closed end position. Finally, when valve 108 has reached the latter position and piston 17 has again moved to the left, actuating pressure, now through lines 66 and 68, and bores 73, 72 and 75, continues to act on piston 78 to hold the control valve 108 in its left closed end position. It will be observed that once the operating lever has been depressed to initiate the supply of actuating pressure through line 1, no further movement of the lever has been necessary since the distribution of the actuating pressure for causing the closing of the control valve, and the maintenance of such valve in its left position, is entirely automatic by reason of the provision of the arrangement just described. It will further be understood from the following explanation that when the actuating pressure has disappeared valve 108 may be again opened by movement from its left end position to its intermediate position under the action of spring 115 to permit a further shifting operation without repeating the movement of the operating lever in its original direction.

If, with valve 108 in its left end position, the driver now returns the operating lever to its rest position, line 1 is vented. The partial vacuum existing in chamber 77 is thus dissipated through bores 75, 72 and 73, and lines 68, 66 and 1. Piston 78 then moves partially to the right under the action of spring 115 until valve 108 reaches its intermediate open position. At such time shifting pressure from chamber 13 is transmitted through lines 102, 83 and 82, so that piston 80 is in its left end position and prevents valve 108 from moving on to its right end closed position. A further shifting operation is possible while valve 108 is in its open position. After the valve is opened, partial vacuum from chambers 13 and 12 acts through line 2 and in a very short time causes piston 17 to move to the right. At such time groove 85 in slide rod 84 is cut off from line 83 and connects line 82 with port 95. The partial vacuum existing in chamber 81 is thus dissipated releasing piston 80 and allowing the control valve 108 to be moved against its right end seat under the action of spring 115.

The shifting cycle has now been completed and valve 108 will not be further actuated until the operating lever is again moved in its first direction, as originally, to supply partial vacuum through line 1 to cause opening of the valve through piston 80 and the subsequent closing of the valve through piston 78.

In addition to the parts heretofore described, it will be noted that in Figure 1 a series of ports 96, 97 and 98 are provided which respectively communicate with the chambers at the right ends of slide rod 84, piston 78 and piston 80 so that such parts may be operated satisfactorily without adverse pressure influences. The mechanism shown in the upper part of the housing may be utilized where it is desired to control an automatic clutch in a motor vehicle through the same operating lever as controls operation of the shifting pressure control valve 108 for the gear shifting mechanism. Such mechanism comprises a valve 91 seating in chamber 94 yieldingly held against its seat by spring 92. Extending from chamber 93 is a vacuum pressure line 183 which will connect with the clutch actuating device. In chamber 89 is an actuating piston 87 yieldingly held in its right end position by a spring 88. Port 99 communicates with chamber 89 at the right end of the piston, and line 67 opening off of branch 66 of the actuating pressure line 1 communicates with the left end of chamber 89. When the operating lever heretofore referred to is depressed to supply partial vacuum through line 1, such vacuum causes piston 87 to move to the left. Through slide rod 90 the clutch control valve 91 is raised off its seat so that partial vacuum supplied through line 6 not only passes on through passage 106 to the gear shifting mechanism control valve 108, but also enters chamber 93 and is transmitted therefrom through line 183 to the clutch actuating device. Again, when the operating lever is released to vent line 1, chamber 89 is similarly vented. Piston 87 thereupon moves to its right end position under the action of its spring 88 and allows valve 91 to be closed through its spring 92.

It will be evident from a comparison of the embodiments of Figures 1 and 2 that the use of the actuating pressure initially operating to open the control valve for the gear shifting mechanism to additionally effect the closing of the valve and/or holding such valve in its closed position may be carried out in a variety of ways. I have illustrated two different types of control valve, the single acting type and the double acting type, and I have further illustrated two entirely different forms of valve actuating mechanism, each of which carries out the principles of the invention. Again, it will be understood that the invention may be utilized to advantage in control devices utilizing operating features cooperative with but not forming an essential part of the invention. It will therefore be understood that the protection of the invention is not to be taken as limited further than may be required by the appended claims.

I claim:

1. In a pressure operated gear shifting mechanism for motor vehicles a pressure line for supplying shifting pressure to the shifting mechanism, a control valve in the shifting pressure line controlling the supply of shifting pressure for the shifting mechanism, vacuum pressure-operated actuating means for the valve, an operating lever controlling the vacuum pressure supply for the actuating means independent of the shifting pressure line movable in one direction to initiate the supply of vacuum pressure to the actuating means and movable in the return direction to cut off the vacuum pressure from the actuating means, and means for causing the supply of vacuum pressure initiated by the lever first to operate the actuating means to open the valve and then to operate the actuating means to close the valve.

2. In a pressure operated gear shifting mechanism for motor vehicles a pressure line for supplying shifting pressure to the shifting mechanism, a control valve in the shifting pressure line controlling the supply of shifting pressure for the shifting mechanism, vacuum pressure-operated actuating means for the valve, an operating lever controlling the vacuum pressure supply for the actuating means independent of the shifting pressure line movable in one direction to initiate the supply of vacuum pressure to the actuating mean and movable in the return direction to cut off the vacuum pressure from the actuating means, and means independent of said operating lever operative between the initial and return movements of the lever to cause the same vacuum pressure to operate the actuating means first to move the valve to open position and then to move the valve from open position to closed position.

3. In a pressure operated gear shifting mechanism for motor vehicles a shifting pressure supply line for the shifting mechanism, a control valve in said shifting pressure supply line, a vacuum pressure supply line to supply pressure for operating said valve, lever operating means independent of the shifting pressure supply line for initiating flow of the vacuum pressure supply, and actuating means operated by the vacuum pressure supply to open the control valve and also operated by the vacuum pressure supply to close the valve independently of the lever operating means after said valve has been opened to transmit shifting pressure.

4. In a pressure operated gear shifting mechanism for motor vehicles a pressure line for supplying shifting pressure to the shifting mechanism, a valve in the shifting pressure line controlling the supply of shifting pressure for the shifting mechanism, piston means movable in opposite directions to open and close the valve, a source of vacuum actuating pressure, lever means independent of the shifting pressure line for initiating the flow of said vacuum actuating pressure, means independent of said lever means for causing said vacuum actuating pressure to act on said piston means first to move the valve in one direction to open position and then to move the valve in the other direction to closed position, and means for delaying the flow of said vacuum pressure acting on the piston means to close the valve.

5. In a pressure operated gear shifting mechanism for motor vehicles a pressure line for supplying shifting pressure to the shifting mechanism a control valve controlling the line of shifting pressure for the shifting mechanism, a vacuum pressure operated actuating member for moving the valve to open position, a second vacuum pressure operated actuating member for moving the valve to closed position, a source of vacuum actuating pressure, lever means for initiating the flow of actuating pressure, and means independent of said lever means for causing the same vacuum actuating pressure to act successively on the first and second actuating members so as to open and then close the valve.

6. In a pressure-operated gear shifting mechanism, a pressure line for supplying shifting pressure to the shifting mechanism, a shifting pressure control valve in said line, vacuum-operated actuating means for the shifting pressure control valve, a source of vacuum for the valve actuating means, lever operated control means independent of the shifting pressure line controlling the supply of vacuum from said vacuum source to the valve actuating means and being actuatable to cause the actuating means to open the valve, and means operative without further actuation of the lever control means after opening of the shifting pressure control valve to cause the vacuum to act on the valve actuating means to close the valve.

7. In a pressure operated gear shifting mechanism for motor vehicles, a pressure supply line for supplying shifting pressure to the shifting mechanism, an auxiliary vacuum pressure supply line, first and second valve means separately controlling the shifting pressure supply line and the auxiliary vacuum pressure supply line respectively, a lever for operating the second valve means, actuating means responsive to vacuum pressure supplied by said second valve means for controlling said first valve means, and means independent of the lever for causing the vacuum pressure controlled by said second valve means to move the actuating means first to open and then to close the first valve means.

8. In a pressure operated gear shifting mechanism for motor vehicles, a pressure supply line for supplying shifting pressure to the shifting mechanism, an auxiliary vacuum pressure supply line, first and second valve means separately controlling the shifting pressure supply line and the auxiliary vacuum pressure supply line respectively, a lever for operating said second valve means and vacuum pressure responsive actuating means operated by the pressure initiated by the lever means first to open and thereafter automatically operated by said pressure to close said first valve means.

9. In a pressure operated gear shifting mechanism for motor vehicles, a shifting pressure line, a control valve in said line controlling the supply of shifting pressure for the shifting mechanism, means for opening the valve, a vacuum pressure actuated motor for closing the valve after opening thereof, a vacuum pressure line communicating with said motor and vacuum pressure means for initiating operation of the valve motor including a vacuum pressure receiving chamber in said vacuum pressure line operative to delay the transmission of vacuum actuating pressure to the valve motor a predetermined time after opening of the valve.

10. In a pressure operated gear shifting mechanism for motor vehicles, a control valve controlling the supply of shifting pressure for the shifting mechanism, means for opening the valve, a vacuum pressure actuated motor for closing the valve after opening thereof, a vacuum pressure line supplying vacuum pressure to the valve motor, and a vacuum pressure receiving chamber in said pressure line for delaying the delivery of vacuum actuating pressure to the valve motor a predetermined time after opening of the valve.

CARL BÖTTNER.